United States Patent [19]

Harries et al.

[11] 3,716,791
[45] Feb. 13, 1973

[54] FLAG ALARM SYSTEM APPLICABLE TO A VOR RECEIVER

[75] Inventors: William S. Harries; Gul C. Asnani, both of Kansas City; John H. Flentie, Independence, all of Mo.

[73] Assignee: American Standard Inc., Falls Church, Va.

[22] Filed: July 24, 1970

[21] Appl. No.: 57,962

[52] U.S. Cl. ................................. 325/363, 325/340
[51] Int. Cl. ............................................... H04b 1/00
[58] Field of Search ............. 325/363, 364, 455, 340; 343/106 R, 107 R, 108 R; 324/83 A, 83 FM, 83 FC

[56] References Cited

UNITED STATES PATENTS

| | | | |
|---|---|---|---|
| 3,470,557 | 9/1969 | Harries | 343/106 |
| 3,382,498 | 5/1968 | Mouradian | 343/108 |

*Primary Examiner*—Robert L. Richardson
*Assistant Examiner*—Barry L. Leibowitz
*Attorney*—Hurvitz & Rose

[57] ABSTRACT

A flag alarm system for a VOR receiver (applicable to other purposes) in which two 30 Hz signals of relatively variable phase normally present in two channels of the receiver, while the latter is operating properly, are multiplied together to produce modulation products including a dc component having a value which is a function of said phase, and which in one form of the invention is employed in a servo loop which indicates or controls said phase, and also a double frequency signal of peak amplitude independent of phase difference but a function of the products of the amplitudes of the 30 Hz signals. The double frequency signal operates to hold a flag inoperative, but cannot hold the flag if either or both 30 Hz signals disappear or are radically reduced in amplitude. The system indicates the presence or absence of valid signals, i.e. the two 30 Hz signals, and overall system malfunction, on a fail-safe basis.

5 Claims, 2 Drawing Figures

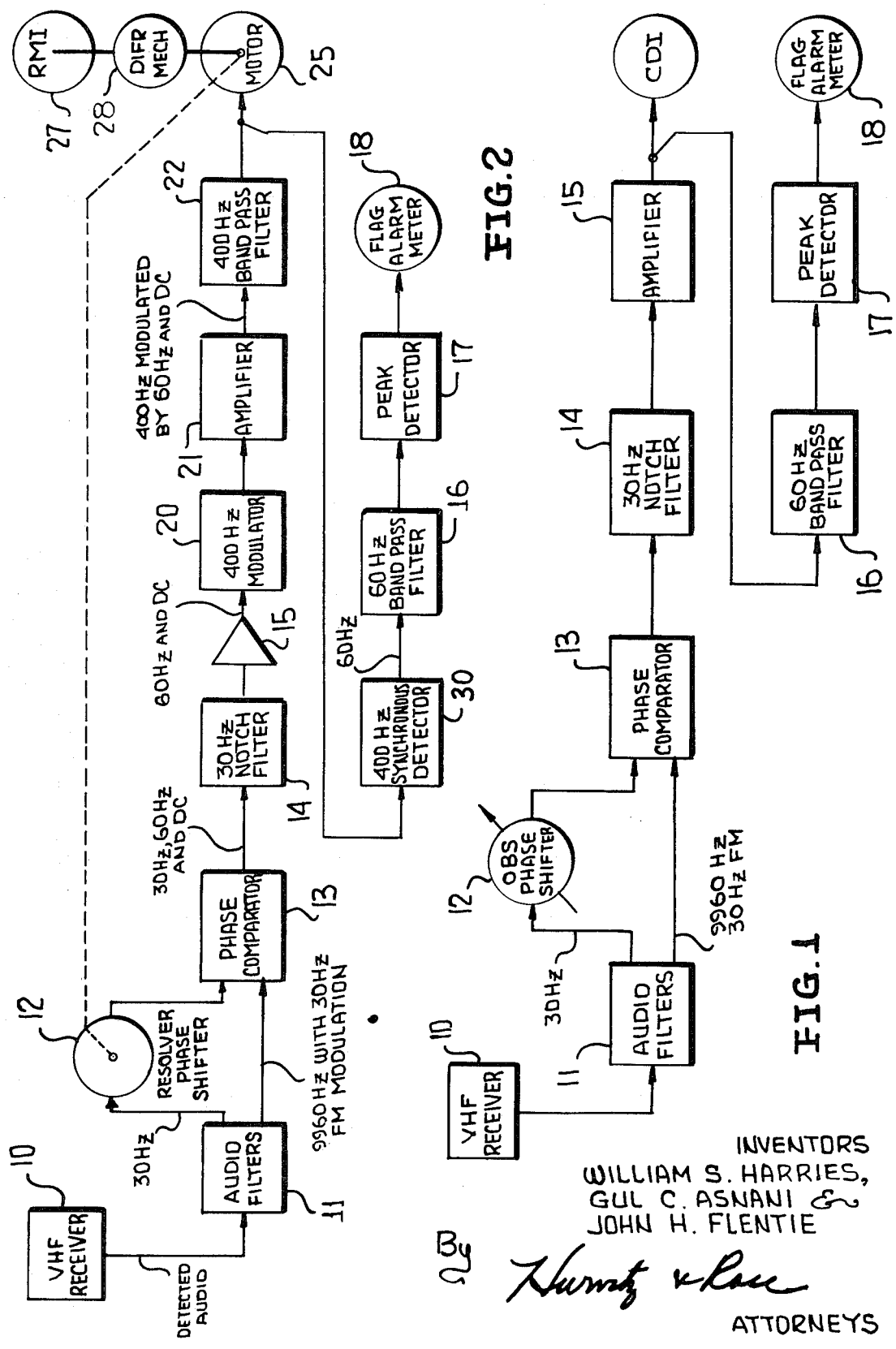

FLAG ALARM SYSTEM APPLICABLE TO A VOR RECEIVER

BACKGROUND OF THE INVENTION

An important feature of many communications equipments is an alarm system whereby the equipment user is alerted to conditions which invalidate the outputs of the equipments. The system of the invention enables the outputs of certain types of ac sine wave phase comparators to be monitored to determine the presence of valid input signals and the lack of equipment malfunctions.

The invention is disclosed in a specific embodiment wherein the phase angle between two signals of the same frequency is measured by applying them to a circuit which effects a multiplication of the two signals, i.e. a VOR receiver. A multiplication of sine waves of like frequency produces three terms: one at dc or zero frequency; one at the input frequency and a third at twice the input frequency. An analytic examination of these terms reveals that the dc term is a trigonometric function of the phase angle between the two inputs and can therefore be used as a measure of such phase angle. However, the amplitude of the term which is twice the input frequency is a function of the amplitudes of the two input signals but independent of the phase angle between them. A measurement of the amplitude of this twice input frequency term can therefore be used to monitor whether both input signals are present simultaneously. Furthermore, if the fundamental input frequency is selectively eliminated from the output signal (such as with a notch filter) and the dc term and the twice input frequency term are retained, then this output signal can be processed through other additional circuits such as amplifiers or modulators retaining at all points the feature that its dc term is a measure of phase angle and its ac term is a measure of the amplitudes of the two input signals. This feature of the invention is extremely useful in extending a monitoring capability to include all circuits between the actual phase comparator and the monitoring point. If the monitoring point is selected very near the output of the device employing the phase comparator, a measurement of the single ac signal at twice the input frequency of the phase comparator effectively monitors the operation of the complete circuit. In the case of the VOR receiver, the operation of substantially the whole receiver is monitored.

One application for such an alarm system is in the Flag Alarm System usually associated with VOR navigational receivers whose phase comparators employ a multiplication process. An alarm function is essential to the operation of navigational receivers in aircraft, as often the pilot has nothing but the direction indicators operated by these receivers on which to base operational decisions. Invalid instrument readings are clearly a dangerous hazard and must therefore be detected as such to operate the equipment alarm circuitry and alert the pilot. The output of such alarm circuitry is normally a Flag Alarm meter built into the direction indicator instruments in such a way as to show a distinct red flag in case of an invalid instrument reading.

There are two kinds of VOR navigational receivers, and the present invention is applicable to both. In the first type, the Manual VOR Receiver, the phase of two 30 Hz signals (here one 30 Hz signal is received as FM modulation of the 9,960 Hz subcarrier and may or may not be demodulated before phase comparison), is compared; the phase difference between them is converted to a dc voltage; and the resultant is applied to a meter (Course Deviation Indicator or CDI) in the cockpit. A phase shifter (Omni Bearing Selector or OBS) is employed in one of the 30 Hz signal paths and is controlled by the pilot to adjust the phase of that signal. When the phase difference between the 30 Hz signals present as modulation of the RF signal received by the radio receiver is exactly cancelled by the phase adjustment set by the pilot, the dc out of the phase comparator is zero and the CDI therefore is at zero. Under these conditions the pilot is flying the bearing indicated on the face of his OBS.

In the second type of VOR receiver, the Automatic VOR Receiver, the same process takes place except that the dc voltage is used to modulate an ac voltage which is applied to a motor. The motor is arranged to drive the phase shifter in proper sense, until the dc error voltage reaches zero. The angular position of the phase shifter at this time indicates actual aircraft bearing and this information is transferred by a synchro connection to an indicator (Radio Magnetic Indicator or RMI) which then displays actual bearing at all times.

The inputs to the phase comparator in the navigational receiver circuit are a 30 Hz sine wave and a 9,960 Hz subcarrier on which a 30 Hz FM modulation is imposed. These signals are obtained by audio detection of a VHF carrier on which both are imposed as AM modulation. The two signals are separated by filters before they are applied to the multiplier-type phase comparator for measurement of the phase difference between the 30 Hz sine wave and the 30 Hz modulation of the subcarrier.

The voltage output of the phase comparator may be expressed as:

$$V_1 = A\cos\phi + \beta\sin(\omega t + \phi) + C\cos(2\omega t + \phi)$$

where $\omega = 2\pi \cdot 30$ Hz $\phi$ = phase angle between the two 30 Hz signals where the $\beta$ term is the residual 30 Hz term, and the $A$ and $C$ terms are dc and 60 Hz difference and sum products respectively of the multiplication process. Since the dc output represented by the A term is a function of the phase angle between the two 30 Hz signals, and is therefore normally the only useful term in the output of a multiplier-type phase comparator, the usual phase comparator circuit filters both the 30 Hz and 60 Hz from out of the output signal leaving only the dc term for further processing. In the present invention however, only the 30 Hz term is filtered out and the 60 Hz term is processed along with the dc term and carried all the way to the output of the motor driver circuit. At this point, the same signal that is used to drive the servo motor is also processed through a 400 Hz synchronous detector to recover the 60 Hz and then through a 60 Hz bandpass filter. The output of the filter is then measured by peak detecting the 60 Hz and applying the resultant dc to the Flag Alarm meter.

The Flag Alarm meter requires a dc voltage to keep it out of an alert condition. With the arrangement described above, if either the 30 Hz signal ($\mu$ variable phase) or the 30 Hz modulation (reference) is not present in adequate amplitude, or if any circuit malfunction occurs, the voltage on the Flag Alarm will decrease and the flag will show. Likewise if any malfunction in the servo loop occurs, the dc error voltage ($A \cos\phi$) at the output of the phase comparator will increase significantly, and an amplifier following the comparator will saturate. The 60 Hz ac component will thus be clipped and the flag will show. This would occur if $\phi = 86°$ or less (94° or more). Normally $\phi$ is 90° $\pm$ 0.1° due to fast response and high gain of the servo loop. Therefore almost complete monitoring of the receiver is accomplished.

Much the same process is followed in applying the invention to a Manual VOR Receiver. The system is much simpler, however, and after eliminating the 30 Hz term and amplifying the dc and 60 Hz terms, the dc is applied to the CDI and the 60 Hz is peak detected and applied to the Flag Alarm.

A significant improvement is effected in the Automatic VOR Receiver by this invention. Manual VOR Receivers have in the past always had adequate Flag Alarm systems, but the Automatic version has not lent itself well to any kind of simple alarm. Either the alarm was left out altogether or it was relatively complex itself, making failure in the alarm system itself more probable.

The invention in its broadest aspect has application wherever it is desired to indicate failure of a predetermined or preset phase difference of two identical signals, or to indicate deviations from such phase difference; or amplitude differences of two signals of known frequencies, or, where it is desired to monitor the operability of a system having two signals of identical frequency in separate channels or to indicate whether or not the two signals are simultaneously present.

While the preferred embodiment of the present invention relates to a VOR system, in which essentially a 30 Hz reference signal is broadcast omnidirectionally and another 30 Hz signal is transmitted by rotating a radiation pattern at 30 Hz, so that the phase difference between the two 30 Hz signals represents direction, other systems exist in which two signals to be compared are not of the same frequency, so that phase difference is not an issue. This problem would exist in respect to air navigation systems, for example in localizer beacon systems, landing pattern systems, Doppler VOR systems. Where two signals have frequencies which are integral multiples of one another, these can be multiplied to attain identical frequencies for comparison. But, in fact, two frequencies which are of relatively random relative frequencies can also be employed, because multiplication of these signals produces sum and difference frequencies. If one of the latter is different from either of the two frequencies, it can be readily distinguished and its absence then is a signal that at least one of the two first mentioned frequencies is absent. Typically, frequencies of 90 Hz and 150 Hz are employed in localizers.

SUMMARY OF THE INVENTION

A system for indicating malfunction of a device which requires in its operation the simultaneous presence of two signals, wherein a phase insensitive modulation product of the two signals is derived, and the absence of that modulation product indicates malfunction.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a block diagram of a manually controlled VOR receiver, including the present invention; and FIG. 2 is a block diagram of a servo-loop controlled VOR receiver, including the present invention.

DESCRIPTION OF THE PREFERRED EMBODIMENTS

In FIG. 1, 10 is a VHF receiver tuned to receive VOR signals, i.e. it is tuned to a VOR carrier modulated by 9,960 Hz, which is in turn frequency modulated at 30 Hz, the latter representing a signal of reference phase, i.e. of the same phase omnidirectionally. The receiver also receives a rotating pattern of energy, the rotation rate being 30 Hz. The latter frequency has thus a phase as seen by the receiver which represents direction of the receiver from a VOR transmitter. The 30 Hz directional signal and the 9,960 Hz subcarrier are separated via an audio filter 11, connected to the output of receiver 10, and the 30 Hz signal applied to a resolver phase shifter 12 capable of shifting the phase of the directional signal through 360°, at will, which is referred to as an OBS, or omni-bearing selector, since at the output of the resolver 12 the 30 Hz directional signal can have its apparent direction varied. This is accomplished manually in the embodiment illustrated in FIG. 1. It now follows that any desired course can be set into the VOR, because any desired phase shift relative to reference phase of the reference signal at 30 Hz can be inserted. If the output of the OBS is adjusted to bring the two 30 Hz signals into 90° phase relation, then the OBS indicates actual course. To fly a desired course it is necessary only to adjust the OBS 12 to that course, and then fly so as to assure a continued phase relation of the two 30 Hz signals.

The outputs of audio filter 11 and of OBS 12 are applied to a phase comparator 13 of the type which multiplies its inputs, producing modulation products, or to a modulator which in some other fashion produces modulation products, i.e. a non-linear or a switching device. The output of the phase comparator 13 includes the original inputs, and sum and difference frequencies, the difference frequency being zero and retaining an indication of phase difference, so that this output includes $$A \cos \phi + B \sin (\omega t + \phi) + C \cos (2\omega t + \phi).$$

The first term represents a dc signal which has a value which is a function of phase difference between the two 30 Hz signals. For 90° phase, the value of the dc component is zero. The sin$\omega t$ component is eliminated by a notch filter 14, and is not employed by the system.

The output of filter 14 is amplified in amplifier 15, the output of which is applied to the CDI (course deviation indicator).

The system is therefore wholly fail safe except in respect to the CDI meter itself. The CDI is a simple meter. If it shorts, this will disable input to the flag circuit, but if it is open circuited no indication of that fact will occur.

The CDI meter is not responsive to ac. The ac output of amplifier 15 is applied to a 60 Hz bandpass filter 16, which provides a 60 Hz output having a peak value which is not a function of phase between the 30 Hz components. This signal is peak detected in detector 17, and the output of the peak detector is a dc signal which is employed to hold a flag alarm meter 18. The latter provides no indication of malfunction so long as the latter dc signal is present and has sufficient amplitude. The nature of the flag alarm is conventionally mechanical-visual, but this is not essential. Of course, the OBS must adjust phase of the directional signal so that the on-course is represented by a zero dc signal, but the sum modulation product has a peak value which depends on the product of the peak amplitudes of the 30 Hz components, but is independent of their phase relation. The flag alarm can be spring biased to be held in the alarm condition, with such bias being overcome so long as the peak amplitude of the 60 Hz component is above some predetermined value. Should the system, considered from receiver 10 to amplifier 15, be inoperative or lacking in either or both 30 Hz components at its input, or should the peak alarm circuit, 16–18 inclusive, be inoperative the flag 18 will indicate this fact.

In the system of FIG. 2, which represents a block diagram of an automatic VOR receiver, the reference numeral 10 again represents a VOR receiver which is cascaded to audio filters 11 which pass detected modulation signals at 9,960 Hz and 30 Hz, in separate channels. The output at 30 Hz is applied to resolver phase shifter 12 and thence to multiplicative phase comparator 13, while the 9,960 Hz signal is applied directly to the latter. The outputs of the latter are then dc, 30 Hz, and 60 Hz, on one lead. The 30 Hz signal is rejected by notch filter 14. The remaining components, i.e. dc and 60 Hz are amplified in amplifier 15 and then applied to modulate a 400 Hz carrier in modulator 20. The output of the latter is amplified by amplifier 21 and the amplified signal filtered by filter 22 to remove all components but the modulated carrier, which carries dc and 60 Hz.

The dc signal controls the level and phase of the 400 Hz carrier, while 60 Hz is carried as modulation. Moreover, the phase of the carrier depends on whether the dc level is positive or negative, which in turn depends on whether resolver phase shifter 12 provides an advanced or retarded phase, relative to the 30 Hz modulation of 9,960 Hz constituting a reference signal. The 400 Hz carrier is then employed to drive a reversible motor, 25, the direction of whose rotation is a function of the phase of the 400 Hz signal, and which is mechanically coupled to resolver phase shifter 12, to drive the latter in such sense and extent as to tend to reduce dc to zero. Accordingly, the dc component of the output of phase comparator 13 is employed to control a servo loop, which tends to reduce the dc to zero, and at that point the resolver phase shifter indicates course being flown, relative to a VOR beacon.

The motor drives a remote loop readout 27 via a differential adjuster 28, to enable remote readout of the setting of resolver 12 (± a predetermined angle applied to the adjusted 28 by the aircraft compass.

The output of the 400 Hz bandpass filter 22 contains a 60 Hz component, which is abstracted from the 400 Hz carrier by a synchronous detector 30. The 60 Hz detected component is applied via a 60 Hz bandpass filter 16 to a full wave peak detector 17, and the output of the latter operates flag alarm 18, as in FIG. 1.

Inserted just antecedent to modulator 20, is amplifier 15 which is capable of passing 60 Hz and dc, but which is biased by the dc if the latter achieves a predetermined level or above, to clip the 60 Hz signal, and for certain dc levels to remove the latter entirely. The dc level is, for normal operation, quite low. If the dc level becomes high this indicates that the servo loop is not operating properly, and in unable to adjust the resolver phase shifter. The latter operates quite rapidly, if operating correctly, i.e. far more rapidly than an aircraft can change course so that a high dc level cannot be the result of a course changes, but must be determined by malfunction.

Any failure of 30 Hz or 9,960 Hz signals, or malfunction of the equipment, from the receiver 10 to and inclusive of the motor 25 will cause the flag alarm 18 to operate.

While we have described and illustrated one specific embodiment of our invention, it will be clear that variations of the details of construction which are specifically illustrated and described may be resorted to without departing from the true spirit and scope of the invention as defined in the appended claims.

What is claimed is:

1. A system for detecting improper operation of a navigational system requiring two signals for its correct operation, wherein said signals are of the same frequency and of variable phase separation, said system comprising:

means for heterodyning said two signals to produce in a single signal channel heterodyne products of said two signals including a dc signal of sign and amplitude which are a function of said phase separation, and at least one heterodyne product of finite frequency different from the frequency of said two signals;

means for detecting and indicating the presence of said one heterodyne product at the output of said channel, including a flag alarm meter subject to a bias into one condition and responsive to at least a predetermined level of said one heterodyne product to overcome said bias and assume an alternative condition;

bearing determination means connected to the output of said channel for responding to changes in the sign and amplitude of said dc signal; and means in said channel responsive to a predetermined amplitude of said dc signal for reducing the level of said one heterodyne product below said predetermined level to cause said meter to assume said one condition.

2. The combination according to claim 1, wherein said bearing determination means includes a reversible rotatable motor, and means responsive to rotation of said reversible motor for reducing said phase separation.

3. Apparatus for detecting improper operation of a navigational system requiring two signals for correct operation, wherein said signals are of the same frequency and of variable phase separation, said apparatus comprising:
- means for combining said two signals to produce modulation products including a dc signal having an amplitude which is a function of said phase separation, and an oscillatory signal of a frequency different from the frequency of said two signals and indicative of the existence of both;
- alarm means for detecting the presence of said oscillatory signal delivered by said combining means, and indicating a nonalarm condition as long as said oscillatory signal has an amplitude of at least a predetermined minimum level and an alarm condition if the amplitude of said oscillatory signal falls below said minimum level;
- bearing determination means coupled with said combining means for responding to changes in the amplitude of said dc signal; and
- means interposed between said combining means and said alarm means and responsive to a predetermined amplitude of said DC signal for reducing the amplitude of said oscillatory signal below said minimum level, whereby the alarm means also indicates an alarm condition if the phase separation of said two signals reaches a predetermined magnitude.

4. In a servo system for maintaining two oscillatory signals in phase:
- means for combining said signals to produce modulation products including a dc signal having a magnitude which is a function of the phase difference between said two signals, and an ac signal having a frequency equal to the sum of the frequencies of said two signals and a peak amplitude independent of said phase difference;
- means for varying the relative phase of said two signals;
- means including a servo-loop responsive to said dc signal for automatically controlling said phase varying means to correct said relative phase to zero phase difference;
- alarm means presenting a flag indication in response to reduction of said peak amplitude below a predetermined value; and
- means responsive to said dc signal for reducing the amplitude of said ac signal if the magnitude of said dc signal reaches a predetermined level.

5. In the system as claimed in claim 4, wherein said servo-loop includes a motor responsive to said dc signal for effecting said automatic control, and wherein is provided means for abstracting said ac signal from said modulation products and for delivering said ac signal to said alarm means, and means immediately antecedent to said motor for connecting said abstracting means to said servo-loop.

\* \* \* \* \*